US012757901B2

(12) United States Patent
Lu et al.

(10) Patent No.: US 12,757,901 B2
(45) Date of Patent: Oct. 13, 2026

(54) CHLORINE DIOXIDE FUMIGATION METHOD TO PREVENT BLACK ROT DISEASE AND PROMOTE WOUND HEALING IN SWEETPOTATO

(71) Applicant: Zhejiang A&F University, Hangzhou (CN)

(72) Inventors: Xinghua Lu, Hangzhou (CN); Linjiang Pang, Hangzhou (CN); Shixin Yu, Hangzhou (CN); Guoquan Lu, Hangzhou (CN); Jiyu Cheng, Hangzhou (CN); Mingyi Yang, Hangzhou (CN); Yuge Guan, Hangzhou (CN)

( * ) Notice: Subject to any disclaimer, the term of this patent is extended or adjusted under 35 U.S.C. 154(b) by 173 days.

(21) Appl. No.: 18/885,572

(22) Filed: Sep. 14, 2024

(65) Prior Publication Data

US 2025/0331522 A1 Oct. 30, 2025

(30) Foreign Application Priority Data

Apr. 30, 2024 (CN) ......................... 202410547355.6

(51) Int. Cl.
*A01N 59/00* (2006.01)
*A01P 3/00* (2006.01)

(52) U.S. Cl.
CPC ................ *A01N 59/00* (2013.01); *A01P 3/00* (2021.08)

(58) Field of Classification Search
None
See application file for complete search history.

(56) References Cited

U.S. PATENT DOCUMENTS

2001/0038805 A1* 11/2001 Hamilton .............. C01B 11/024 422/29

FOREIGN PATENT DOCUMENTS

KR 20150134502 A * 12/2015 ............... A23B 7/00

OTHER PUBLICATIONS

Machine Translation of KR-20150134502-A (Year: 2015).*
Lin et al., Extension of shelf like of semi-dry longan pulp with gaseous chlorine dioxide generating film, International Journal of Food Microbiology, vol. 337, 2021 https://doi.org/10.1016/j.ijfoodmicro.2020.108938 (Year: 2021).*
Gastec, Concentration Unit Conversion, https://www.gastec.co.jp/en/technology/knowledge/concentration/, retrieved online on Apr. 16, 2026 (Year: 2026).*

* cited by examiner

*Primary Examiner* — Jennifer A Berrios

(57) ABSTRACT

A chlorine dioxide fumigation method to prevent sweetpotato black rot and promote the wound healing in sweetpotatoes is provided. Chlorine dioxide ($ClO_2$) is applied to prevent and control of sweetpotato black rot for the first time. It has a good inhibitory effect on *C. fimbriata* growth and an obvious preventive effect on sweetpotato black rot. The treatment time is short with high safety levels, no residue, and little harm. The combined reagents are used to fumigate stored sweetpotatoes with small dosage, ensuring uniform medication and obvious efficacy without any phytotoxicity observed during the process. This can effectively reduce the disease rate of sweetpotato black rot during storage and maintain quality effectively. Additionally, the combined reagents can also promote wound healing on damaged surfaces of sweetpotatoes and effectively prevent infection from pathogenic fungi during storage.

3 Claims, 4 Drawing Sheets

CHLORINE DIOXIDE FUMIGATION METHOD TO PREVENT BLACK ROT DISEASE AND PROMOTE WOUND HEALING IN SWEETPOTATO

CROSS REFERENCE TO THE RELATED APPLICATIONS

This application is based upon and claims priority to Chinese Patent Application No. 202410547355.6, filed on Apr. 30, 2024, the entire contents of which are incorporated herein by reference.

TECHNICAL FIELD

The invention relates to the technical field of preventing and controlling sweetpotato black rot, in particular to a chlorine dioxide ($ClO_2$) fumigation method to prevent sweetpotato black rot and promote wound healing in sweetpotatoes.

BACKGROUND

Sweetpotato belongs to the family of Convolvulaceae and it is an annual or perennial herb. It is not only a food crop, but also a feed and industrial raw material crop. Sweetpotato root can be used as people's staple food, and it is also an important raw material for food processing, starch, and alcohol manufacturing industry. Fresh sweetpotato has crisp and tender tissue, high water content, and strong respiration, which is easy to be infected with black rot and soft rot.

After the sweetpotato harvest, farmers often opt to store their produce to enhance their economic income through staggered market sales. The conventional storage method is mostly cellar storage. However, during the sweetpotato harvest, pathogenic fungus *Ceratocystis fimbriata* (*C. fimbriata*) often attaches to the surface of sweetpotato. When mechanical damage occurs during harvest and new wounds form, the *C. fimbriata* can further invade the sweetpotato and cause sweetpotato black rot during storage. Besides, the infectivity of sweetpotato black rot is highly potent without timely treatment, it can quickly spread throughout the entire storage area and cause huge economic damage for farmers. Therefore, the removal of pathogenic fungus from the sweetpotato surface has become a key problem in their storage process.

The traditional fungistatic methods have limited effectiveness and most of them have security risks, while soaking treatment leaves moisture residue and leads to the decay of sweetpotato. In contrast, the gas fumigation does not affect the surface humidity and the operation is more convenient. Therefore, it is crucial to develop safe and efficient gas fumigants. Therefore, it is crucial to develop safe and efficient gas fumigants.

SUMMARY

The purpose of this invention is to disclose a fumigation method to prevent sweetpotato black rot and promote the wound healing in sweetpotatoes. It provides a fumigation reagent and method with high safety and simple operation to prevent sweetpotato black rot and promote the wound healing in sweetpotatoes, so as to effectively prevent and control sweetpotato black rot during storage.

In order to achieve the above purpose, the invention discloses a fumigation method to prevent sweetpotato black rot and promote the wound healing in sweetpotatoes, a fumigating preparation is $ClO_2$ gas, and an effective concentration of $ClO_2$ is 0.93-2.27 mg/L.

Preferably, fumigating sweetpotatoes in a closed environment by preparing the $ClO_2$ gas at an effective concentration.

Preferably, $ClO_2$ gas is prepared by mixing sodium chlorite and citric acid at room temperature, and a mass ratio of sodium chlorite to citric acid is 1.77:1.

Preferably, according to the size of the storage space, inputting a corresponding proportion of sodium chlorite and citric acid for reaction to produce an effective concentration of $ClO_2$, carrying out a fumigation treatment in a closed space, the specific steps are as follows:

selecting sweetpotatoes with no obvious disease and placing the sweetpotatoes with no obvious disease in the storage space, mixing the sodium chlorite and citric acid in the corresponding proportion to obtain a mixture, and placing the mixture at a top of the storage space away from the sweetpotatoes with no obvious disease, closing for 25-30 h.

Preferably, a storage capacity of sweetpotatoes with no obvious disease is set at 1.3-1.7 kg sweetpotatoes/10 L storage space; crushing and screening the sodium chlorite and citric acid by a 45-mesh sieve before mixing, the sodium chlorite and citric acid should be mixed only when using and a uniform mixing should be guaranteed.

An application of the fumigation method for a combined reagent that prevents sweetpotato black rot and promotes the wound healing in sweetpotatoes in storage.

The sodium chlorite powder and citric acid powder can generate a chemical reaction by physical mixing to produce $ClO_2$ gas, a reaction equation is as follows: $15NaClO_2+4C_6H_8O_7=4Na_3C_6H_5O_7$ (sodium citrate)$+12ClO_2+3NaCl+6H_2O$.

Therefore, the invention discloses a fumigation method to prevent sweetpotato black rot and promote the wound healing in sweetpotatoes, the specific technical effects are as follows:

(1) For the first time, $ClO_2$ gas is applied to the prevention and control of sweetpotato black rot, it has a good inhibitory effect on *C. fimbriata*, and has an obvious preventive effect on sweetpotato black rot, the treatment time is short with high safety level, and there is no residue and little harm.

(2) The combined reagent provided by the invention is used for the fumigation of stored sweetpotatoes, the dosage is small, the medication is uniform, and the efficacy is obvious, no phytotoxicity is found during the process, which can effectively reduce the mildew rate of sweetpotatoes during storage and effectively maintain the quality of sweetpotatoes during storage.

(3) The combined reagent provided by the invention can also promote the wound healing of the damaged surface of sweetpotatoes and effectively prevent the infection of pathogenic fungi during storage of sweetpotatoes.

The following is a further detailed description of the technical solution of the invention through drawings and embodiments.

BRIEF DESCRIPTION OF THE DRAWINGS

In order to explain the technical solution of the embodiment of the invention clearly, the figures needed to be used in the description of the embodiments of the invention are introduced briefly in the following. Obviously, the figures in the following description are only some embodiments of the invention. For ordinary technicians in this field, other drawings can be obtained according to these drawings without paying creative labor.

DETAILED DESCRIPTION OF THE EMBODIMENTS

The following is a further explanation of the technical solution of the invention through drawings and embodiments.

In order to make the purpose, technical solution, and advantages of this application more clear, thorough, and complete, the technical solution of the invention is described clearly and completely through the attached drawings and embodiments, the following detailed descriptions are descriptions of the embodiments, aiming to provide further detailed descriptions of the invention. Unless otherwise specified, all technical terms used in the invention have the same meaning as those commonly understood by the general technical personnel in the field to which the application belongs.

The instruments, equipment, and reagent materials used in the embodiments are obtained through commercial means.

Embodiment 1

A combined reagent to prevent sweetpotato black rot and promote the wound healing in sweetpotatoes is prepared, the method is as follows:

0.071 g sodium chlorite and 0.040 g citric acid are accurately weighed after crushing and screening by a 45-mesh sieve, and then the weighed components are put into a mixed reaction kettle for 10 s, and then the reaction kettle is placed in a 10 L closed space for fumigation.

Embodiment 2

A combined reagent to prevent sweetpotato black rot and promote the wound healing in sweetpotatoes is prepared, the method is exactly the same as Embodiment 1, except that the components are 0.124 g sodium chlorite and 0.070 g citric acid.

Embodiment 3

A combined reagent to prevent sweetpotato black rot and promote the wound healing in sweetpotatoes is prepared, the method is exactly the same as that of Embodiment 1, except that the components are 0.177 g sodium chlorite and 0.100 g citric acid.

Embodiment 4

A preparation of the fungus suspension of *C. fimbriata*, the method is as follows:

*C. fimbriata* preserved at −80° C. is thawed and resuscitated at 4° C., 200 μL *C. fimbriata* is taken into 15 mL PDA medium plates in the ultra-clean table and cultured at 28° C. for 7 d. After 7 d, 5 colonies of *C. fimbriata* are picked on the medium and inoculated into the expanding culture medium with an inoculation needle for further culture for 7 d. After 7 days, some of the expanding culture plates are used to prepare fungus pieces, and some plates are used to prepare spore suspension. Sterile water is added into the culture plate, the mycelium is scraped and filtered through four layers of sterile gauze to remove the mycelium and medium impurities, and the spore suspension of *C. fimbriata* is obtained. The spore concentration is calculated by the blood cell counting plate, and adjusted to $10^6$ spore/mL.

Experimental Test 1

Figure 1:
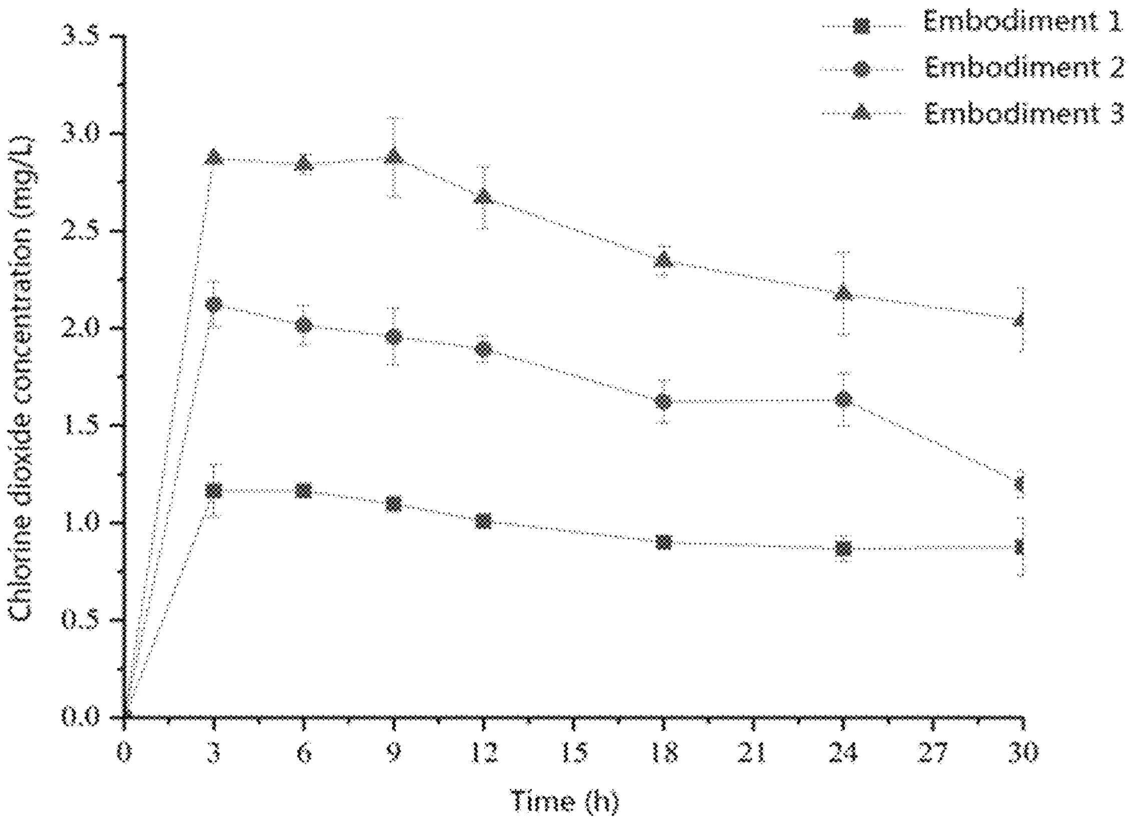
FIG. 1 is a change of the $ClO_2$ concentration in the first 30 hours of Experimental Test 1 of the invention.

The concentration of $ClO_2$ gas prepared by the combined reagent of the method described in Embodiments 1-3 has been determined. The specific steps are as follows:

The combined reagent prepared by the method described in Embodiments 1-3 will be fixed on the top of the 10 L fresh-keeping box, and then the fresh-keeping box will be sealed and stored in the dark for 30 h. During the period, the headspace of the fresh-keeping box will be collected every 3 h with a syringe for the determination of $ClO_2$ gas concentration, with 3 replicates each time. The final $ClO_2$ concentration is mg/L. The results of $ClO_2$ concentration determination in the first 30 h are shown in FIG. 1. By calculating the integral area of the concentration measurement curve, the average concentrations of each group of the embodiments are obtained. The average concentration of $ClO_2$ in Embodiment 1 is 0.93 mg/L, the average concentration of $ClO_2$ in Embodiment 2 is 1.55 mg/L, and the average concentration of $ClO_2$ in Embodiment 3 is 2.27 mg/L.

It can be seen that the combined reagents prepared by the method described in Embodiments 1-3 can quickly generate $ClO_2$ gas, the concentration of $ClO_2$ is stable in the first 12 hours, and then decreases slowly. Therefore, the combined reagents prepared by the method described in Embodiments 1-3 can quickly reach a higher $ClO_2$ concentration in the initial stage of treatment, thus achieving a better bactericidal effect. It can also be seen that the concentration of $ClO_2$ produced by different quality combinations of sodium chlorite and citric acid is different, and the concentration of $ClO_2$ produced by the combined reagent prepared by the method described in Embodiment 3 is the highest.

Experimental Test 2

The combined reagents prepared by the method described in Embodiments 1-3 are used to investigate the inhibition of *C. fimbriata* in vitro. The methods are as follows:

The expanding culture plate of *C. fimbriata* cultured in Embodiment 4 is selected, and the fungus piece is prepared by using a 10 mm sterile puncher, the fungus piece is reversely connected to the center of the PDA medium, and the PDA plate is placed in a 10 L fresh-keeping box, and the combined reagents prepared by the method described in Embodiments 1-3 are added, the plate is fumigated with $ClO_2$ for 4 h, the culture plate is moved into a constant temperature incubator at 27° C. for 15 d after the treatment. The colony diameter of the culture plate is measured by the cross method every 3 days, the measurement is repeated three times, and the plate without $ClO_2$ fumigation is used as the blank control.

The results showed that as shown in Table 1, the colony diameter of the blank control group gradually increased with time, and the diameter of the original fungus piece gradually increased from 10 mm to more than 60 mm. After the $ClO_2$ fumigation treatment, the colony diameters are inhibited or even grown during the whole process of culture, indicating that $ClO_2$ can directly inhibit the growth of *C. fimbriata*.

TABLE 1

| Test sample | $ClO_2$ concentration (mg/L) | Colony diameter of 3 days after application (mm) | Colony diameter of 6 days after application (mm) | Colony diameter of 9 days after application (mm) |
|---|---|---|---|---|
| Control group | 0 | 19.4583 | 34.8417 | 60.05 |
| Embodiment 1 | 0.93 | 10 | 10 | 10 |
| Embodiment 2 | 1.55 | 10 | 10 | 10 |
| Embodiment 3 | 2.27 | 10 | 10 | 10 |

Experimental Test 3

The inhibitory effect of the combined reagents prepared by the method described in Embodiments 1-3 on the growth of *C. fimbriata* in sweetpotato is investigated, the method is as follows:

Xinxiang sweetpotatoes are selected as the experimental material, the sweetpotatoes are washed and disinfected with 75% alcohol, the sterile puncher is used to punch the equatorial positions of the sweetpotatoes, each sweetpotato is punched with two holes, and the depth of each hole is 2 mm, the diameter of each hole is 8 mm, and the two holes are located on the opposite side, 20 μL fungus solution with a spore concentration of $10^6$ spore/mL prepared by Embodiment 4 is added to each hole to simulate the sweetpotato wound infection. Then the sweetpotatoes are placed in a 10 L fresh-keeping box, and the combined reagents prepared by the method described in Embodiments 1-3 are fixed on the top of the fresh-keeping box, then the fresh-keeping box is sealed and stored in dark for 30 h. After the treatment, the fresh-keeping box is first ventilated and sweetpotatoes are transferred to a normal storage incubator (25° C., humidity 85%) for storage to observe the changes in the sweetpotato inoculation sites, the inoculated sweetpotatoes without $ClO_2$ fumigation treatment are used as the control group.

Figure 2A:
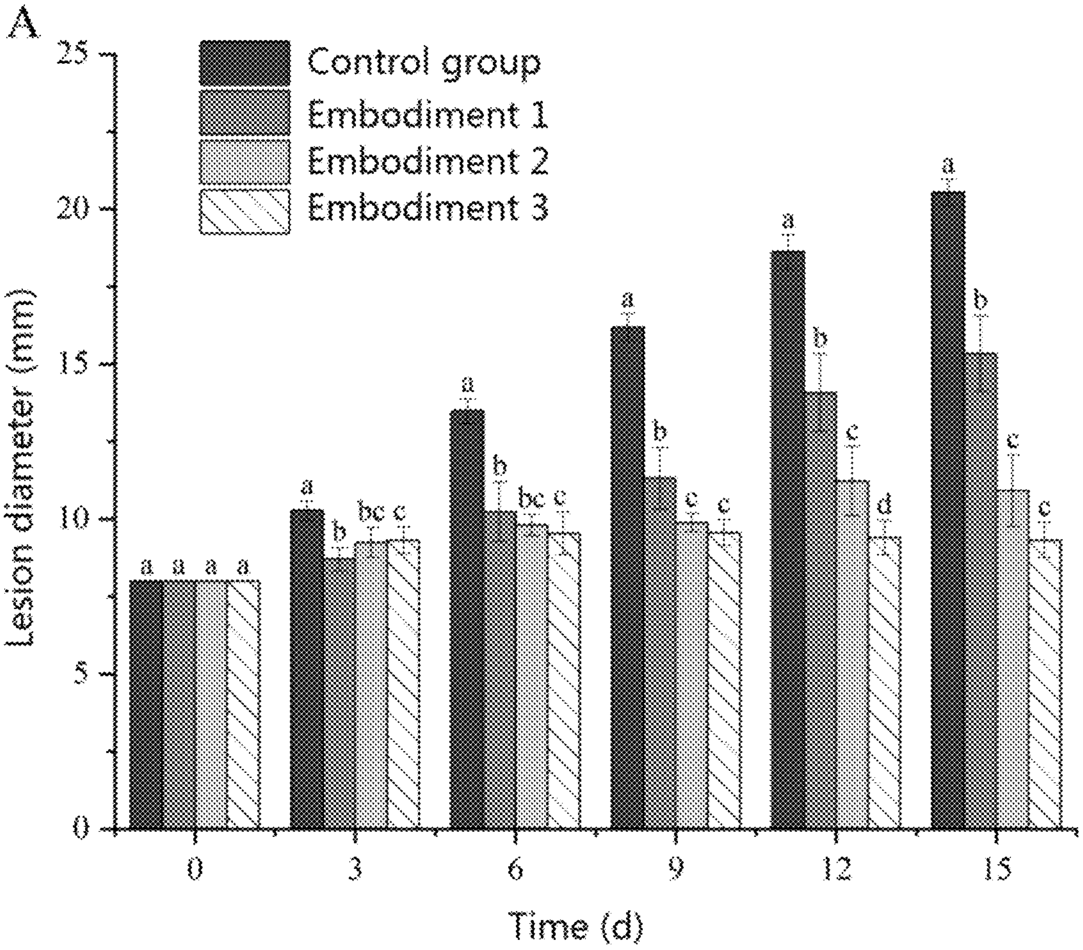
FIGS. 2A-2C are statistical results of the lesion diameters (FIG. 2A), the lesion depths (FIG. 2B), and part of the lesion photos (FIG. 2C) of the sweetpotatoes in Experimental Test 3 of the invention.
Figure 2B:
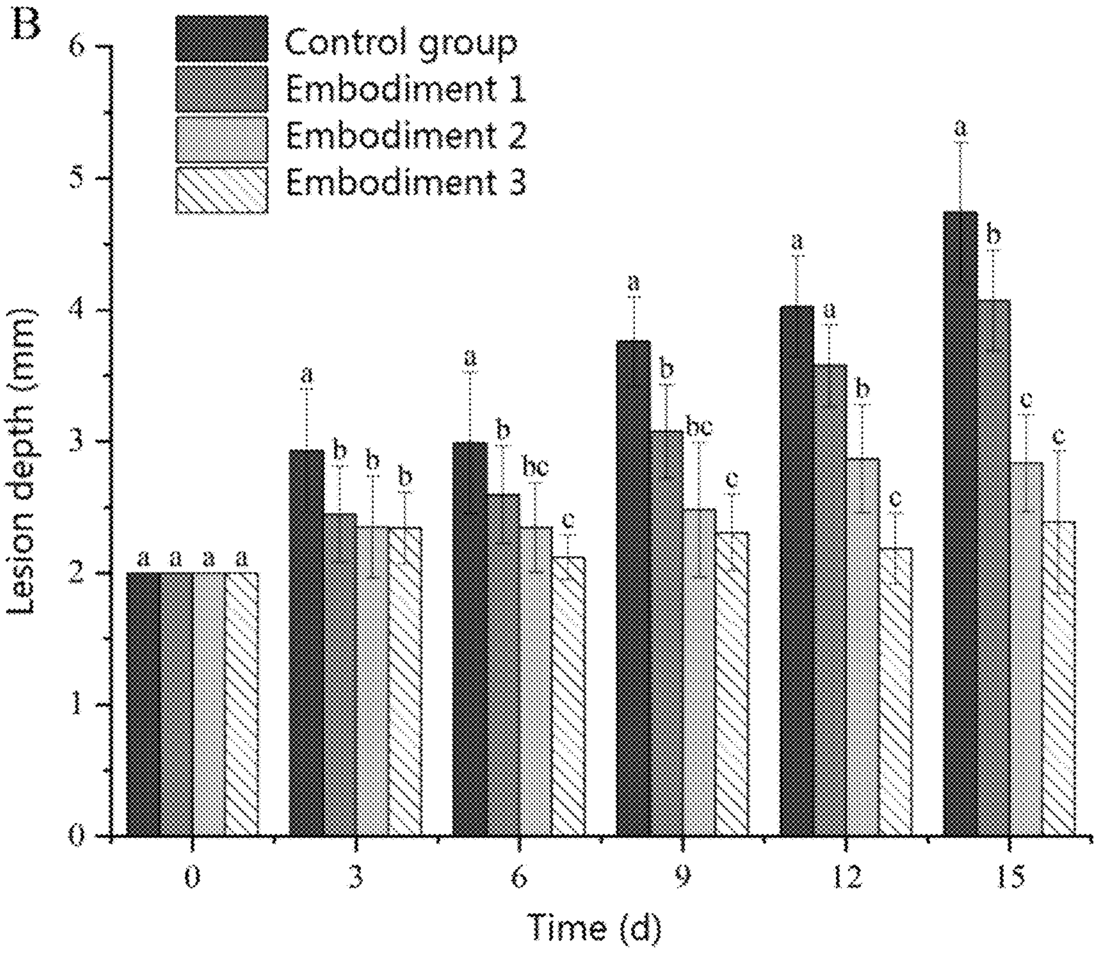
Figure 2C:
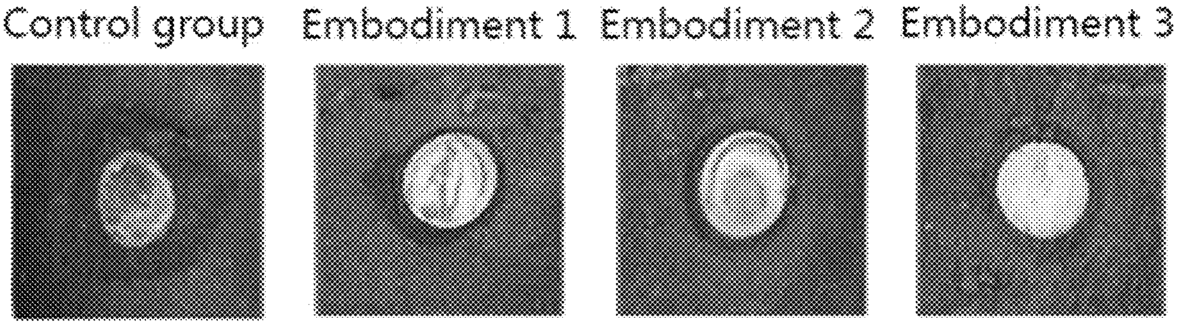

Under the condition of constant temperature and humidity storage, the diameters and depths of the lesion are investigated every 3 days after treatment to characterize the incidence of the disease, storage for 15 days. The results are shown in FIGS. 2A-2C. After $ClO_2$ fumigation treatment, the surface disease of sweetpotatoes is weakened. and the diameters and depths of the lesion decreases significantly with the increase of treatment concentration. Compared with the $ClO_2$ fumigation treatment group, the lesion diameters and lesion depths in the control group increases significantly during storage. Among them, the depth of sweetpotato lesions treated with the combined reagent prepared by the method described in Embodiment 3 is well inhibited and no obvious lesions. It shows that the fumigating concentration of $ClO_2$ produced by the combined reagent described in Embodiment 3 can inhibit the black rot of the inoculated sweetpotato.

Experimental Test 4

The effects of the combined reagents prepared by the method described in Embodiments 1-3 on promoting the wound-healing ability of sweetpotatoes are investigated, the method is as follows:

Xinxiang sweetpotatoes are selected as the experimental material, the sweetpotatoes are washed and then dried naturally after disinfected with 75% alcohol, the sterile puncher is used to punch the equatorial positions of the sweetpotatoes, each sweetpotato is punched with holes, and the depth of each hole is 5 mm, the diameter of each hole is 2 mm, then the sweetpotatoes are placed in a 10 L fresh-keeping box, and the combined reagents prepared by the method described in Embodiments 1-3 are fixed on the top of the fresh-keeping box, then the fresh-keeping box is sealed and stored in dark for 30 h.

After the treatment, the fresh-keeping box is first ventilated, and the sweetpotatoes are transferred into a normal storage incubator (25° C., humidity 85%) for storage. During the storage of sweetpotatoes, 20 μL of fungus solution with a spore concentration of $10^6$ spore/mL prepared in Embodiment 4 is evenly applied to the surface of the wounds on the 0th, 1st, 3rd, 5th and 7th day, respectively, the incidence of the disease after 7 days is counted and the disease index is calculated. Each treatment is repeated three times with 12 sweetpotatoes. The sweetpotatoes with perforation damage but without $ClO_2$ treatment are used as the control group, and the disease index is calculated by the following formula:

$$\text{Disease index (\%)} = \frac{\sum(\text{Number of wounds in each disease grade} \times \text{Disease grade})}{\text{Total number of wounds} \times \text{The highest disease grade}} \times 100$$

The standard of the disease grade in the formula is as follows: grade 4: The surfaces of the wounds are all infected; grade 3: ¾ surfaces are infected; grade 2: ½ surfaces are infected; grade 1: ¼ surfaces are infected; grade 0: not infected.

Figure 3:
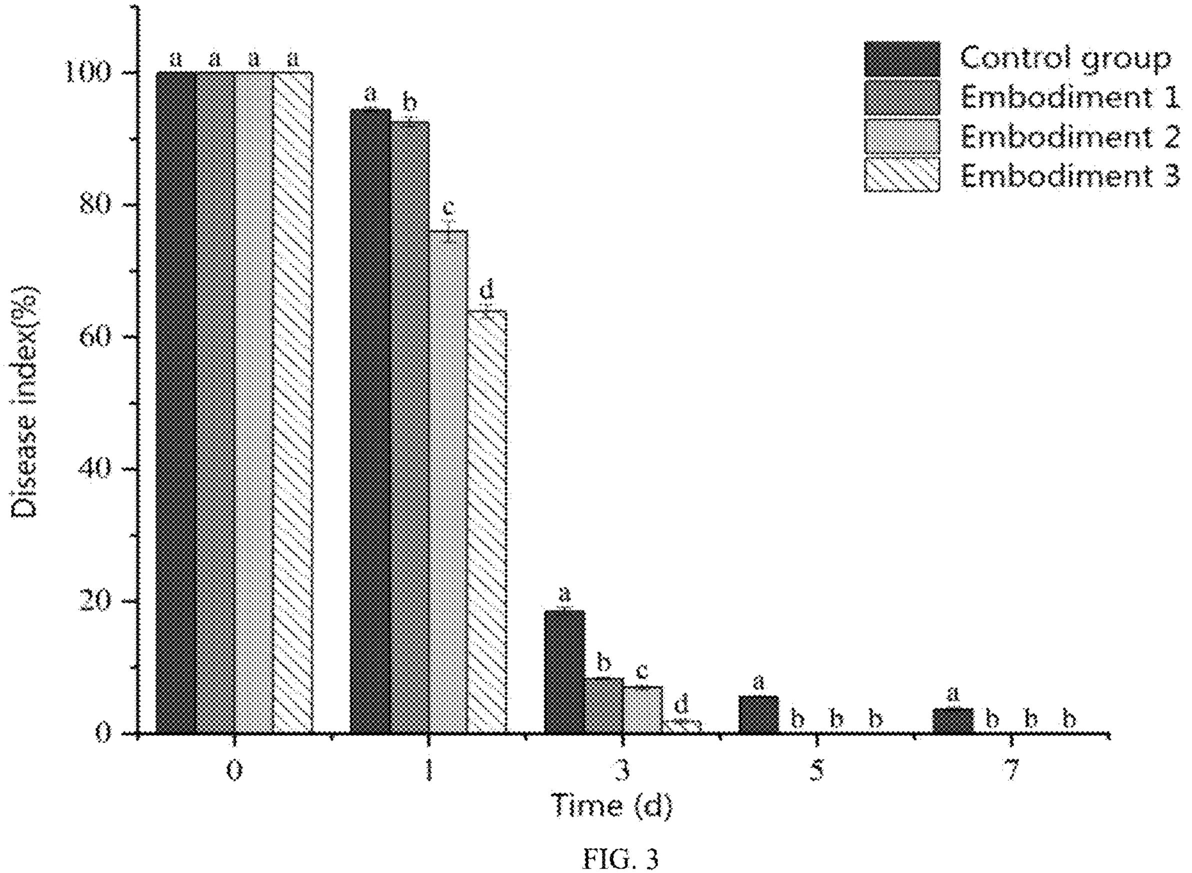
FIG. 3 is a statistical result of the disease index of sweetpotatoes in Experimental Test 4 of the invention.

The results are shown in FIG. 3. After $ClO_2$ fumigation, the sweetpotatoes after 5 days of healing can completely resist the infection of pathogenic fungus, because the *C. fimbriata* cannot invade the sweetpotatoes through the wound in the short term. It shows that $ClO_2$ treatment can promote the wound healing in sweetpotatoes. Among them, the combined reagent prepared by the method described in Embodiment 3 has the best ability to promote wound healing on the surface of sweetpotatoes. The sweetpotatoes in the control group re-inoculated the spores of *C. fimbriata* on the 7th day of wound healing is still infected.

Therefore, $ClO_2$ is applied to the prevention and control of sweetpotato black rot for the first time, it has a good inhibitory effect on the *C. fimbriata* growth, and has an obvious preventive effect on sweetpotato black rot, the treatment time is short with a high safety level, and there is no residue and little harm. The combined reagents provided by the invention are used for the fumigation of stored sweetpotatoes, the dosage is small, the medication is uniform, and the efficacy is obvious, no phytotoxicity is found during the process, which can effectively reduce the rate of disease loss during the sweetpotato storage and effectively maintain the quality. The combined reagents provided by the invention can also promote the wound healing and effectively prevent the infection of pathogenic fungus during the sweetpotato storage.

Finally, it should be explained that the above embodiments are only used to explain the technical solution of the invention rather than restrict it. Although the invention is described in detail concerning the better embodiment, the ordinary technical personnel in this field should understand that they can still modify or replace the technical solution of the invention, and these modifications or equivalent substitutions cannot make the modified technical solution out of the spirit and scope of the technical solution of the invention.

What is claimed is:

1. A chlorine dioxide fumigation method to prevent sweetpotato black rot and promote wound healing in sweetpotatoes with no obvious disease, comprising using a $ClO_2$ gas generated by mixing sodium chlorite and citric acid at room temperature to fumigate the sweetpotatoes with no obvious disease in a closed environment at an effective concentration, wherein the effective concentration of the $ClO_2$ gas is 0.93-2.27 mg/L;

wherein a storage capacity of sweetpotatoes with no obvious disease is set at 1.3-1.7 kg sweetpotatoes/10 L of a storage space of the closed environment; and the sodium chlorite and the citric acid are crushed and screened by a 45-mesh sieve before mixing, and the sodium chlorite and the citric acid are uniformly mixed at time of use.

2. The chlorine dioxide fumigation method to prevent sweetpotato black rot and promote wound healing in the sweetpotatoes with no obvious disease according to claim 1, wherein a mass ratio of the sodium chlorite to the citric acid is 1.77:1.

3. The chlorine dioxide fumigation method to prevent sweetpotato black rot and promote wound healing in the sweetpotatoes with no obvious disease according to claim 2, wherein according to a size of a storage space, inputting a corresponding proportion of the sodium chlorite and the citric acid for a reaction to produce the effective concentration of the $ClO_2$ gas, and carrying out a fumigation treatment in the closed environment, comprises the following steps:

selecting the sweetpotatoes with no obvious disease and placing the sweetpotatoes with no obvious disease in the storage space, mixing the sodium chlorite and the citric acid in the corresponding proportion to obtain a mixture, and placing the mixture at a top of the storage space away from the sweetpotatoes with no obvious disease, and closing the storage space for 25-30 hours.

* * * * *